United States Patent [19]

Forkner

[11] 3,860,725

[45] Jan. 14, 1975

[54] PROCESS FOR THE TREATMENT OF COCONUT AND PRODUCTS RESULTING THEREFROM

[75] Inventor: John H. Forkner, Fresno, Calif.

[73] Assignee: The Pillsbury Company, Minneapolis, Minn.

[22] Filed: Feb. 26, 1973

[21] Appl. No.: 335,688

Related U.S. Application Data

[63] Continuation-in-part of Ser. No. 240,191, March 31, 1972, abandoned.

[52] U.S. Cl. ............... 426/44, 426/207, 426/213, 426/331, 426/378, 426/373
[51] Int. Cl. ......... A23b 7/08, A23l 1/06, A23l 1/36
[58] Field of Search .................. 426/205, 207, 44

[56] References Cited
UNITED STATES PATENTS

| | | | |
|---|---|---|---|
| 331,559 | 12/1885 | Senn | 426/205 |
| 3,573,064 | 3/1971 | Noznick | 426/205 |

FOREIGN PATENTS OR APPLICATIONS

| | | | |
|---|---|---|---|
| 557,966 | 5/1958 | Canada | 426/207 |
| 51,961 | 1/1942 | Netherlands | 426/207 |

OTHER PUBLICATIONS

Canadian Patent Record page 3,302–3,301, No. 400, 921, No. 400, 922.

*Primary Examiner*—Samih N. Zaharna
*Assistant Examiner*—J. M. Hunter
*Attorney, Agent, or Firm*—Flehr, Hohbach, Test, Albritton & Herbert

[57] ABSTRACT

A process for the treatment of coconut meat to produce modified edible coconut in divided form, and food products incorporating the same. Also a process for producing pastes suitable for use in bakery and confectionary products and other products like jams. The process employs acid treatment to disrupt and disorient the cell structures of the coconut, thereby tenderizing and increasing the absorptivity of the coconut. Processing following such treatment includes neutralization to arrest the tenderizing operation and to remove the acid. The products produced by the process include the modified coconut in moist paste form without additives, the moist paste refrigerated or frozen, the coconut particles in dry powder form, sugar based pastes, and pastes and products derived from the same, including without limitation jams, marmalades, spreads and other products with edible additives.

12 Claims, 2 Drawing Figures

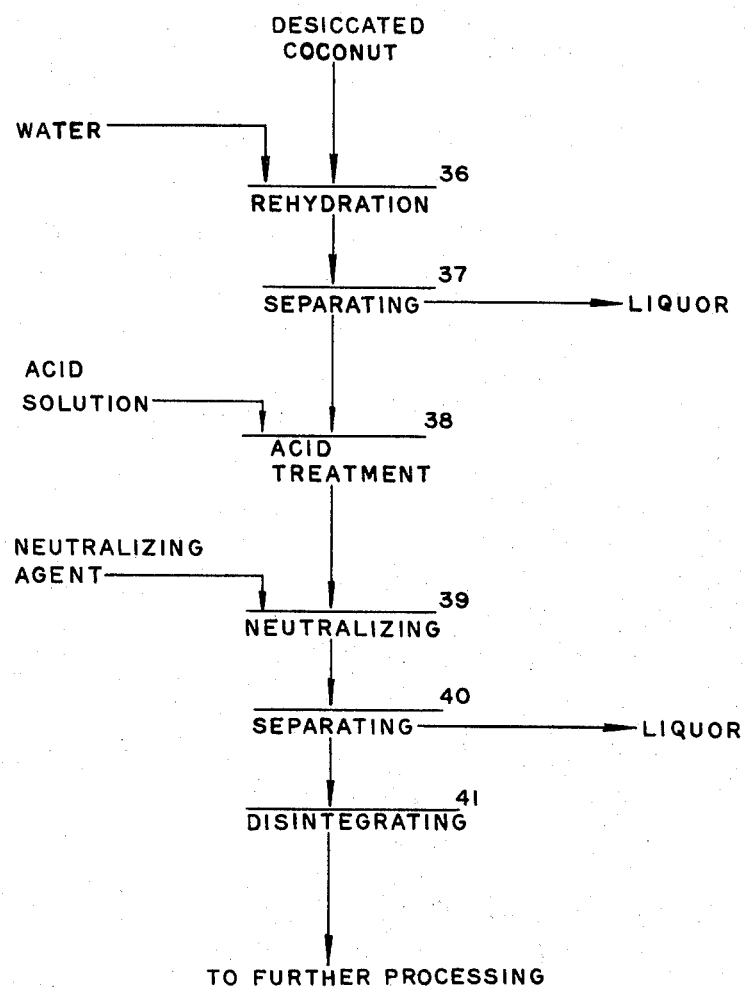

PROCESS FOR THE TREATMENT OF COCONUT AND PRODUCTS RESULTING THEREFROM

REFERENCE TO RELATED APPLICAATIONS

Reference is made to copending application Ser. No. 452,740 filed Mar. 20, 1974, a continuation of Ser. No. 240,191, filed Mar. 31, 1972 now abandoned, of which this application is a continuation in part. Also reference is made to copending application Ser. No. 173,106, filed Aug. 19, 1971, which is a continuation in part of applications Ser. Nos. 866,452 filed Oct. 15, 1969, now abandoned, and 74,310 filed Sept. 22, 1970, now abandoned, and to copending application Ser. No. 335,834, filed Feb. 26, 1973.

BACKGROUND OF THE INVENTION

This invention relates generally to the processing of coconut meat and to edible products resulting from the same.

Coconut meat as used in various foods has been subject to a number of disadvantages. Particularly, it has a fiber structure such that it is tough, whether in the form of fresh meat, dried or desiccated coconut, treated with sugar or sugar syrup, incorporated in other products. When a dried or desiccated coconut is ground to form a powder, in an effort to circumvent the toughness of coconut in piece form, the resulting material has a number of disadvantages. The ground material tends to "oil out" and takes on the physical character of coconut fat. Also it is not amenable to impregnation by many liquid food materials. If such a ground desiccated coconut is dispersed in a material like jam, the jam is gritty, thus impairing palatability. On storage such jam becomes hard to the point of inedibility, and the characteristic coconut flavor tends to dominate the product. Thus ground coconut has limited usage in the food industry largely because the separated oil is undesirable in many products.

Copending application Ser. No. 240,191, of which this application is a continuation in part, discloses a process in which the characteristics of coconut meat are advantageously modified by acid treatment under controlled conditions of temperature, hydrogen-ion concentration, and time.

SUMMARY OF THE INVENTION

In general, it is an object of the present invention to provide a process for the treatment of coconut meat in such a manner as to modify the same and to produce a material in the form of discrete particles that are absorbent and which impart distinct properties to various products in which the particles are incorporated.

Another object is to provide a process which modifies coconut meat in such a manner that it becomes absorptive and amenable to impregnation by a wide variety of other edible materials.

Another object is to provide a process which modifies source coconut meat in such a manner as to form discrete particles incorporated in and serving to characterize and stabilize a sugar-based paste.

Another object is to provide a process making use of coconut meat for the manufacture of paste products that are usable in the food industry in place of products commonly known as "kernel paste" or "almond paste," and which have distinct advantages and properties not possessed by such known pastes.

Another object is to provide a process which modifies coconut meat in such a manner as to form discrete absorptive particles that are amenable to impregnation with further incorporation of such particles into edible products like pastes, jams, marmalades and the like, the particles serving to provide new and novel characteristics to the products in which they are incorporated. The term jam as used herein is intended to include such sugar based products as those that have a fruit or other flavoring, with or without pieces of fruit, berries or other edible pieces like natural nuts, and commonly known in the trade as jam, jelly and marmalade. In effect dispersion of the modified particles with material like sugar syrup involves interimpregnation, that is impregnation of the absorptive coconut particles with syrup and impregnation or dispersion of such sugar absorbed particles in the syrup.

Another object of the invention is to provide novel products resulting from the foregoing process, including moist tenderized coconut paste in the form of finely divided discrete particles, a dry powdered product comprising such particles, nut-like pastes or fillers, sugar based pastes suitable for use in the baking and confectionery industries, and jams and other formulated food products incorporating such particles or pastes.

In general, the present process includes the treatment of coconut meat (e.g., desiccated coconut) at an elevated temperature in an aqueous solution of a physiologically acceptable acid (e.g., hydrochloric acid). The acid treatment acts upon the coconut meat, and particularly upon the cells of the meat, whereby the cells appear to be disrupted and the cell fiber oriented in a random fashion (i.e., disoriented). Also, cementitious material is removed. At some point in the process all or most of the coconut meat may be reduced to finely divided form, as distinguished from pieces or particles of visible size. The finely divided and modified coconut material may be used in moist form without further treatment, or may be reduced to the form of a dry powder. This material may be further processed to incorporate the same with sugar to form a sugar-based paste. Also such material and pastes may be incorporated in other formulated food products.

additional objects and features of the invention will appear from the following description in which the preferred embodiments have been set forth in detail in conjunction with the accompanying drawings.

BRIEF DESCRIPTION OF THE DRAWINGS

FIG. 2 is a flow diagram illustrating another embodiment of the process.

DESCRIPTION OF THE PREFERRED EMBODIMENTS

Figure 1:
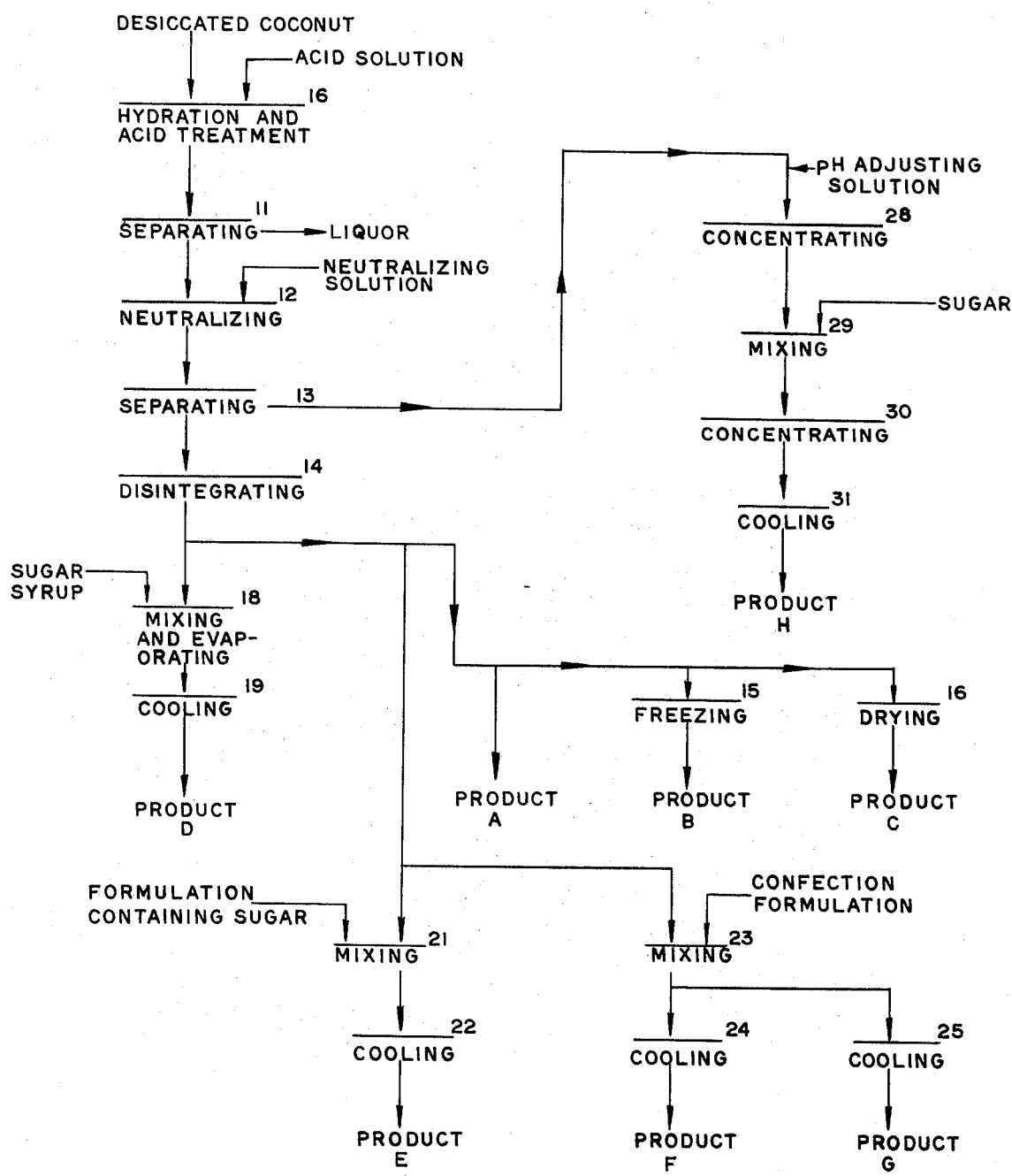
FIG. 1 is a flow diagram showing one procedure for practicing the invention.

The present invention employs treatment steps including subjecting the coconut to the action of an acid solution at an elevated temperature. The source material may be one of the various forms of commercially available coconut meat, preferably desiccated coconut of the macaroon, short shred, conventional shredded and string types. The pieces of desiccated meat may range in thicnkess from about 0.015 to 0.15 inches, and in length from about 0.08 to about 4 inches. However, in some instances the length of the coconut strings may exceed 4 inches. Such dried coconut is readily available and generally retains its original fat content.

A typical analysis of such desiccated coconut is as follows:

| | |
|---|---|
| Moisture | 3.5% |
| Fat | 64.9% |
| Protein | 7.2% |
| Fiber | 3.9% |
| Carbohyrate other than fiber | 19.1% |
| Ash | 1.4% |
| | 100.0% |

In the embodiment of FIG. 1, such desiccated coconut is shown being supplied to the acid treatment step 10. Prior to being supplied to this step, the coconut meat may be treated in boiling water for the purpose of rehydrating the same. Also in such pretreatment a small amount of the oil or fat content is removed. After such rehydration, free water is removed and the moist material supplied to the treatment step 10. Any fat removed in such pretreatment can be separated from the removed water as by centrifuging. Assuming that the desicated coconut is supplied directly to the step 10, then in the preliminary phase of this step rehydration occurs by absorption of acid solution. The water in the pretreatment step, if it is employed, may be at a temperature ranging from 85° to 212°F., and the period of treatment may be over periods of the order of from 5 to 60 minutes.

Step 10 is carried out by mixing the coconut meat with water which has been acidified. A simple inorganic acid may be used such as hydrochloric, and in typical instances the acid concentration may range from about 0.13 to 2% to provide a hydrogen-ion concentration ranging from pH 2 to 0.57. The acid can be added to the water either before or immediately after the water has been mixed with the coconut meat. During this treatment, the batch is maintained at an elevated temperatue which in typical instances may range from about 180° to 212°F. If carried out under pressure greater than atmospheric, the temperature may range up to about 250°F.

While hydrochloric acid has been found to be effective, any other physiologically acceptable inorganic acid like sulfuric or phosphoric can be used, provided that the acid does not injure the coconut or cause objectionable residues that are difficult to remove. Organic acids like lactic, tartaric, citric, malic and fumaric have been found to be effective, but they are not deemed to be as desirable because of the relatively large amounts of acid required and the extended treatment times involved.

The time required for step 10 for a given acid concentration depends upon the amount of tenderizing required. Also it ranges inversely with the treatment temperature. For temperatures ranging from 180° to 212°F., the amount of time required for a reasonable amount of tenderizing will vary inversely from about 60 to 5 minutes (optimum 25 to 15 minutes), for acid concentrations ranging from 0.13 to 2%. The time of treatment can be reduced to as low as about 1 minute by heating to temperatures above 212°F. (e.g., 250°F.) at pressures above atmospheric, although this involves use of additional expensive equipment.

One simple procedure which has been used with good results, using ½% hydrochloric acid solution, is to heat the acidified water to boiling or near boiling temperature, after which the desiccated coconut is added and the batch heated back to boiling temperature and held at that temperature for a period of 13 to 25 minutes. Preferably the tenderizing treatment is carried out so that it is effective with respect to both surface and core portions of the coconut pieces.

As will be presently explained in greater detail, the tenderizing in step 10 modifies the cell structure of the meat, and as a part of this modifying effect, cementitious material which serves in the natural coconut to cement the cell fiber and cells together, is to a substantial extent dissolved. The dissolved material includes a substantial part of the protein content of the coconut.

Following acid treatment in step 10, the batch at this point may be subjected to decantation, draining, or centrifuging for the purpose of removing liquor in step 11 from the moist tenderized coconut meat. Various types of equipment which can be used for this step include a simple screen upon which the material can be discharged to permit draining, centrifuges of the basket type, continuous or batch filters, or filter presses of the feedscrew type. In some instances the container used for step 10 may be provided with a screen arrangement to enable liquid to be drained off without removing the material. When step 11 is omitted all of the liquor remains with the batch until removed in a subsequent step.

The moist and tenderized coconut meat is then subjected to a neutralizing step 12 for the purpose of neutralizing residual acid. This is carried out by the adition of a suitable neutralizing agent. A solution of sodium carbonate is effective for this purpose. The final pH of the liquid of the batch after neutralization can be of the order of 5 to 6.5 (optimum 5.5 to 6.0). The neutralizing step also serves to terminate further tenderizing, which is attributed to both acid neutralizing and cooling. Neutralizing beyond pH 6.5 (e.g., to pH 7.0) tends to cause some darkening of the coconut. After the neutralizing agent is added the batch is held for a period of time (e.g., 20 minutes or more) to complete reaction with the acid present. Assuming that the neutralizing agent is a solution, the extent of cooling depends upon the amount of water represented by the solution and its temperature, which may be well below ambient room temperature. Cooling in this manner may rapidly reduce the temperature of the batch to a level of the order of 160° to 185°F.

In place of sodium bicarbonate, added directly or as a solution, other neutralizing agents can be used, including for example potassium bicarbonate, sodium or potassium carbonate, sodium or potassium hydroxide, ammonia (in gas form or as a water solution) and lime. Sodium bicarbonate is desirable because it does not form any deleterious or objectionable substances and salt formed by reaction with hydrochloric acid (NaCl) is normally desired in food products.

Following neutralizing in step 12, the material is subjected to dewatering in step 13, which can be carried out by use of any of the methods and equipment mentioned in connection with step 11.

The moist coconut material from step 13 is shown being subjected to disintegration in step 14 for the purpose of obtaining a desired state of particle subdivision. This operation can be carried out by the use of various types of disintegrating equipment, such as a suitable hammer mill.

Product resulting from the disintegrating step 14 is indicated as Product A and consists of a moist mass of finely subdivided particles which may vary in consistency from a slurry to a mash-like paste, depending upon the retained mositue content. Such a product can be stored for short periods of the order of 1 to 6 hours at ambient room temperature, pending further processing. Under refrigerator temperature following precooling the storage time can be extended to several days without deterioration. Also it can be frozen in step 15 to form Product B, or it can be preserved by conventional canning methods, for preservation. The product of step 14 in slurry form can be subjected to drying 16 to produce the Product C. Drying can be carried out by use of conventional spray drying equipment whereby the Product C is in the form of a dry discrete powder. Other conventional drying equipment can be used, such as dryers of the drum, vacuum drum, vacuum shelf, etc.

Various uses for the Products A, B and C will be subsequently described in greater detail. However, the Products A, B and C are marketable of themselves, without further processing. They are all characterized by the fact that the coconut has been tenderized and the particles made absorbent with respect to other edible materials.

Further processing of the moist coconut material from step 14 for the manufacture of a sugar based paste involves incorporating the material in a hot sugar syrup as indicated in step 18. The formulation of the sugar syrup may vary in accordance with the characteristics desired in the final paste. For example, sucrose, invert sugar, hydrolyzed cereal solids of low dextrine equivalency (e.g., Morex), and corn syrup can be used, either separately or in combination. The syrup may for example have an initial concentration of the order of from 40 to 60 Brix. Also the syrup preferably is at elevated temperatures at or near its boiling point, as for example, at a temperature of from 215° to 230°F. Immediately after introducing a quantity of the moist discrete coconut material into the hot sugar syrup, a drop in temperature occurs, but with continued heating the temperature returns to near boiling point. After introduction into the sugar syrup, moisture of the coconut meat particles is absorbed into the syrup, and the syrup penetrates the solids. By continued heating the syrup is progressively concentrated by evaporation until it reaches a concentration of the order of 76 to 90 Brix, where it can be stored at ambient room temperature. After the batch cools to atmospheric temperature, it has the consistency of a viscous paste, which has good keeping properties and which is suitable as a base material for the manufacture of other products. Such a paste can be subjected to conventional milling in a paste mill such as a Five High Roll Mill for developing further smoothness. A preferred procedure is to first introduce the moist coconut material into standard commercial hot corn syrup, after which the batch is subjected to preliminary concentration by boiling, during which time some of the moisture content of the coconut is removed and the syrup impregnates the particles. Then the invert sugar and sucrose is added and concentration by evaporation continued to the end of the cycle.

Instead of introducing the moist mash into the hot syrup, a simpler procedure is to place all of the ingredients in a suitable container and then heat the contents during mixing and agitation to the temperature level required for evaporation and pasteurization.

In the event less viscous products are desired, step 14 can be controlled whereby the concentration at the end of the evaporation cycle may be in the range of about 65 to 80 Brix to provide products ranging in consistency from that of a jam to a paste.

Instead of concentrating the syrup by progressive evaporation at atmospheric pressure by conventional methods, it is desirable to employ the concentrating method and planetary type of evaporating apparatus disclosed in copending application Ser. No. 288,009 filed Sept. 11, 1972. Also vacuum evaporation can be used with continual agitation.

The basic paste described above can be used to advantage in the baking industry with or without dilution, particularly by incorporating it into or with various doughs and batters. When the paste is incorporated with an uncooked dough form, as for example as a filling between two layers of uncooked dough, and subsequently subjected to baking temperatures, the paste retains sufficient body and viscosity to remain substantially intact. In other words, it does not melt and run from the piece and does not merge or coalesce with the dough. Generally the baker or the food processor making use of the paste will reduce the viscosity by adding in one or more diluents. For example, some sugar syrup may be introduced into the paste with mixing or milling to provide a thinned product which can be more readily used in various bakery products.

Instead of using the paste as an identifiable mass, it may be homogeneously blended with the dough or batter. When so used it alters the bread or cake crumb of the baked mass, and in addition it imparts moisture retention and longer shelf life and a different mouth feel.

The paste described above, either by itself or diluted, can also be used in various confections. When so used, it serves to impart body or viscosity to the mixes during processing, and also it lends a desirable texture and stability to the finished confection without imparting undesirable graininess.

Another use for the paste described above is in the manufacture of such products as jellies, jams, marmalades and spreads, all referred to herein as jams. When used for this purpose, the paste is dispersed in the jam formulation, preferably at an elevated temperature. The dispersed coconut particles, that have been structurally modified by the acid treatment, lend body to the mix, although they do not function as a gelling agent. In contrast to use of such common thickening agents as starches, gums, gelatin, pectin and algenates, which function as gelling agents, mixtures like jams containing such dispersed particles retain their body when subjected to baking temperatures and do not become unacceptably fluid. Also in contrast to farinaceous thickeners (e.g., starch or flour) such dispersed particles do not form a crumb when baked. In addition the use of such particles in mixes like jams imparts desirable stability, particularly in that when used in fillers for bakery products (e.g., cakes) migration of moisture to and from the ajacent dough is inhibited. Since the coconut flavor of the paste is mild, it is readily masked over by flavoring ingredients in the formation.

The moist material from step 14 can also be used in the direct manufacture of various food products, such as jams. Thus in step 21 the moist material from step 14 is shown being incorporated with a sugar syrup-containing formulation, such as a jam or marmalde formulation. As is well known, such formulations consist mainly of sugary syrup, together with flavoring, with or without other edible solids such as particles of nuts, particles of fruit and the like. Step 21 can be carried out in a manner comparable to step 18. In other words, the formulation can be at or near boiling point when the moist material from step 14 is added. Then the processing involves further heating and concentration of the mix while the batch is being agitated. Here again a concentrating method and equipment can be used such as disclosed in said copending application Ser. No. 288,009. At the end of the mixing operation, when the mix has attained the desired concentration and the desired impregnation of the coconut, it is then subjected to cooling 22 to produce the final Product E.

Step 23 shows the mixing of moist material from step 14 with sugar-containing formulation of the confection type. The mixing step 23 may correspond to cooking operations used in the making of confections, and the introduction of the moist material from step 14 may occur at the beginning or during this cooking. The formulation of the confection and proportions used in mixing the moist material with the confection can be adjusted to provide, at a desired impregnation and concentration of the confection, a mix of the desired viscosity or body, in which the dispersed modified coconut particles have been impregnated by liquid of the mix. At the end of step 23 the material can be subjected to cooling 24 to form the confection Product F. In some instances it may be desirable to subject the confection mix to drying 25 to form the low moisture content Product G. Either Product F or G, while brittle, may be reduced to granular form to form a discrete confection product.

In the foregoing reference has been made to optional use of pretreatment before step 10 for the purpose of rehydrating the desiccated coconut before the acid treatment. Also reference is made to optional removal of liquor in step 11, before the neutralizing step 12. Assuming that neither one of these optional steps are used, then the liquor removed in step 13 contains all of the constituents removed from the coconut meat plus a small amount of salt resulting from reaction of the neutralizing agent with the acid. A general analysis of this liquor, in a typical instance, is as follows:

| | |
|---|---|
| Coconut fat | 3.05% |
| Coconut fiber, finely divided | .15% |
| Protein | .69% |
| Sugars | 1.02% |
| Mineral (ash) | .66% |
| Moisture | 94.43% |
| | 100.00% |

The above percentages are subject to variations depending on such factors as the analysis of the source coconut meat, the control of the acid treatment and the amount of water used in proportion to the amount of coconut being treated. Thus by reducing the amounts of water added, the above liquor may have a fat content ranging from 3 to 14%, with the content of the other solids ranging accordingly.

The coconut fat content of liquor from steps 11 and/or 13 results from the liberation of fat which occurs in conjunction with disruption of the fibrous cell structures. The protein content results mainly from dissolution of the cementitious material which serves as a binder for the cell structure fiber, and constitutes a substantial percentage (e.g., 30–50%) of the total protein content of the coconut meat before treatment. The coconut fiber is in finely divided condition and results from some disintegration of the coconut pieces during the acid treatment. Particularly some disintegration occurs along the regions of the edges and corners of the pieces, where the action of the acid solution is more intense, and because of abrasion during processing. The fiber may consist of dirupted cells and fiber particles resulting from disruption of cells.

It has been found that one or more valuable by-products can be obtained by processing of the liquor from step 13, assuming that step 11 is omitted. The pH of this liquor may be adjusted to a desired value (e.g., at or near pH 7.0) by adding a suitable neutralizing agent (e.g., an alkali-like sodium bicarbonate or sodium bicarbonate solution). After pH adjustment the liquor is shown being subjected to concentration in step 28, after which sugar or sugar syrup is shown being added in step 29. After sugar is added the material is shown being further concentrated in step 30, followed by cooling 31, to produce Product H. Assuming that the solids content of Product H are of the order of 76%, it is in a form of a creamy paste, which can be used as a base paste in the preparation of various other food products, particularly products where it is desired to introduce the finely divided and impregnated coconut solids, together with the other solids derived from the liquor, including sugar, fat and protein.

Instead of making a separate Product H from the liquor removed in step 13, some of the concentrate from step 28 can be blended with products previously described. For example such concentrate can be introduced into the mixing step 21 whereby the resulting product is provided with a substantial amount of coconut fat and protein. Also it can be introduced into steps 18, 21 or 23 to provide a fat content and some added protein for the products D, E, F and G.

The liquor from step 13 (or from step 11 if used) may be centrifuged to recover coconut fat, and such fat introduced into various products, such as Products D, E, F and G.

In some instances and where step 11 is employed the liquors from both steps 11 and 13 may be merged for further processing or fat removed from liquor taken off step 11 may be merged with liquor from step 13.

Reference has been made to possible pretreatment of the desiccated coconut before the acid treatment step 10. This is illustrated in FIG. 2. Desiccated coconut in this instance is shown being treated in step 36 by water at an elevated temperature (e.g., 85° to 212°F.) over a sufficient period of time to substantially complete rehydration (e.g., 5 to 60 minutes). In step 37 the rehydrated coconut material is subjected to separation for the removal of free liquor. Some fat is also removed during rehydration, and this can be separated from the removed liquor by suitable means such as centrifuging. Also the liquor contains some solubles dissolved from the desiccated coconut, including a small amount of protein. The moist coconut material is now subjected to the acid treatment 38, after which acid is neutralized in step 39. Liquor separated from the tenderized material in step 40 may be subjected to further processing as described in connection with FIG. 1. The tenderized meat is then subjected to disintegrating 41, carried out in the same manner as the disintegrating step 14 of FIG.

1, and thereafter may be further processed in the manner described in connection with FIG. 1.

In general it is deemed desirable to arrest the tenderizing action in step 10 by neutralizing the acid and by cooling to a temperature of the order of 160° to 185°F., and then proceed with further processing operations as described above. However, it has been found that the moist mash Product A can be subjected to a mild fermentation step for developing cheese-like flavor, after which further fermentation can be arrested as for example by refrigeration or freezing, by drying, or by further processing to produce Products D, E and F. Preferably the fermentaion medium consists of enzymes present. Thus a batch of the moist Product A can be held for 24 hours at a temperature of 90°F. in an atmosphere of high relative humidity (e.g., 80%) with occasional stirring. Under such conditions some fermenting action takes place and the material acquires a distinct cheese-like flavor and odor. Also some further tenderizing of the meat particles occurs and the material develops a plastic cheese-like consistency. In the further processing of such a paste or mash, cheese can be used as an ingredient of the impregnating medium used in step 21.

It is possible to control the acid treatment step 10 in such a manner that the coconut meat is not only tenderized and made to be absorptive in that it is amenable to being impregnated by other edible materials, but may also be partially or substantially entirely disintegrated to a relatively small particle size. Thus by using an acid solution of sufficient concentration (e.g., 1% HCl solution) at boiling temperature (212°F.) for a sufficiently extended period (e.g., 30 minutes), a substantial amount of disintegration occurs, thus simplifying or making possible omission of mechanical disintegration, with production of a smooth texture analogous to cheese. It is considered preferably however to maintain the physical piece form of the coconut during the acid treatment. This is because the piece form facilitates separation of the coconut from liquors or wash water, in contrast with the more difficult separation of finely divided meat particles. Also it has been observed that acid treatment of finely divided particles of coconut tends to impair the ability of the modified material to function as a stabilizer, although improving the texture of certain end products.

In the foregoing the process has been described as applicable to desiccated forms of coconut meat. It is possible to use fresh coconut meat as the source material, in which event it is not necessary to rehydrate the material, either in preliminary treatment or during the initial part of the acid treatment step 10. While the described process releases fat during processing, the source coconut employed may have had some of its fat removed, in which event less fat is released during processing. Also where copra or copra meal is used as the source material, it may have been previously treated to remove skin material and fat.

The process can be carried out in a simplified fashion where the presence of ingredients in the liquor removed in steps 13 or 40 are comparable with or desirable in the final products. Thus separating steps 11 and 13 can be omitted whereby the liquor and the solids contained in the liquor (fat, protein, salt, etc.) remain with the batch. The entire batch is then subjected to disintegration 14 and the resulting slurry used in preparing end products as previously described. In steps 18, 21 or 23 the water content of the liquor is removed by evaporation. Also some water can be removed by evaporation in making Products A and B and preliminary to spray drying in making Product C.

When mechanical disintegration is used in steps 14 and 41, with or without milling, the coconut particles are of a size such that they are not separately visible in a final product. When acid treatment is controlled to cause disintegration, the coconut particles may vary in size, with some being of visible size. By using a granular desiccated coconut as the source material (i.e., macaroon coconut) the acid treatment can be controlled to avoid complete disintegration during this step, whereby the moist mash obtained is composed of tenderized particles or granules of visible size, together with some finely divided solids. Such a material may be used without further disintegration in making products like confections, where some particles of visible size may be desired.

Examples of the invention are as follows:

EXAMPLE 1

The source material was 400 pounds of commercial desiccated coconut in macaroon form having a moisture content of about 2.5%. It contained all of the original oil content of the coconut meat. Twelve hundred pounds of water was acidified by the addition of 16 pounds of 37% hydrochloric acid solution to provide a 0.5% hydrochloric acid solution and a hydrogen ion concentration of pH 1.3. The solution was heated to boiling point (212°F.) in a steam-jacketed agitated kettle, and the desiccated coconut added. There was an initial drop in temperature but with a continuous supply of heat the temperature returned to 212°F. in about 1 minute, and thereafter the batch was held at boiling temperature with continuous agitation for about 15 minutes. Heating was then discontinued and a neutralizing solution added. The solution used was prepared by dissolving 12 pounds of sodium bicarbonate in 80 pounds of water. The neutralizing solution at about 60°F. was added over a period of about 2 minutes, whereby the temperature of the batch was rapidly reduced. The batch was then held with further agitation for about 20 minutes, at which time the pH of the liquid was 5.8. It was observed that the tenderizing action of the acid solution was abruptly terminated with addition of the soda solution, which was attributed to rapid cooling together with neutralization of the acid. Liquor was then separated from the moist coconut material by processing in a continuous filter screw press, thereby providing a dewatered mass having a moisture content of about 60%. The material at that time was in the form of tenderized particles having a mild coconut flavor together with residual traces of salt resulting from reaction of the acid with the sodium bicarbonate. While the salt content and some remaining coconut flavor were not deemed objectionable, it was verified that such residual flavor and salt content could be reduced by redispersing in fresh water followed again by removal of liquid in a filter press or other dewatering equipment.

The tenderized moist mass produced as described above was slurried with 150 pounds of water and then passed through a Fitzpatrick hammer mill having its rotor driven at 3,600 rpm, and using a No. 2 screen. This served to convert the material to the form of a paste or mash having only a minor part of the material in sufficiently large particle size to be visibly discernable. This product corresponded to Product A of FIG. 1.

The above described paste had a substantial residual fat content. However, there was no evidence of oiling or, in other words, there was no free fat evident on inspection. This was attributed to the absorptive character of the acid treated coconut particles and the ability of the particles to be subdivided without release of the fat. Likewise there was no evidence of oiling after further grinding in equipment of the Fitzpatrick Comminuter type.

It was verified that a paste or mash produced as described above could be used to advantage as a thickener or filler in various products. Thus it was dispersed in various soups with the result that it provided substantial thickening without masking the desirable soup flavors. Also it was used to serve as a filler for various formulated food products, such as egg rolls, and meat sausage. When used as a thickener or filler it was observed that it did not cause jelling of the product in which it was introduced, and the extent of thickening attained was not dependent upon the temperature of the product. Thus when used in bakery products such as doughs and batters, it provided thickening at either baking or ambient temperatures. When incorporated in cooky and cake batters it was observed after baking that there was a different crumb structure and mouth feel in eating, compared to control samples made without adding the mash, and that a substantial amount of stability was imparted to the baked products, particularly with respect to retention of a desired moistue content and shelf life. The baked products had good eating properties, having reference to mouth feel and chewiness.

The desirable properties described above are attributed to a substantial extent to the ability of particles to effect interimpregnation when incorporated with various liquid or semiliquid food material. The term interimpregnation as used herein has reference to the ability of the particles to be uniformly dispersed in the food material while at the same time being impregnated with the same material.

portions of the paste produced as in this Example 1 were refrigerated at a temperature of about 40°F., and stored under refrigeration for a period of several days. Upon visual inspection it appeared that refrigeration served to extend the period that the paste could be stored without deterioration or spoilage. A portion of the paste was also frozen to a temperature well below 32°F. It was found that this could be stored indefinitely without visible deterioration.

Instead of using macaroon type of desiccated coconut, it was verified that the same procedure described in this Example 1 could be carried out using conventional shredded and string forms of desiccated coconut, or partially defatted coconut or blends thereof.

The procedure of the foregoing Example 1 was modified by reducing the amount of 37% hydrochloric acid from 16 to 14 pounds. Also the amount of sodium bicarbonate used was reduced from 12 pounds to 9.5 pounds and dissolved in 125 pounds of water. The bicarbonate solution was at about 32°F. when added to the batch. After a holding period of 20 minutes following introduction of the neutralizing solution, the temperature was about 184°F. and pH 5.6.

EXAMPLE 2

The liquor separated from the tenderized coconut in Example 1 was processed as follows. 700 pounds of this liquor was evaporated to 30% solids concentrate, after which it was mixed with 200 pounds of corn sugar. This was then further evaporated to produce a concentrate containing 75% solids, which when cooled formed a product corresponding to Product H of FIG. 1. In general this product was a creamy paste which included finely divided solids resulting from some disintegration of the coconut meat in the acid treatment, together with coconut fat. Also it contained some protein that had been dissolved from the coconut meat during the acid treatment. It was determined that the fat content of the separated liquor resulting from the treatment of 700 pounds of coconut as in Example 1 amounted to 74 pounds.

It was also verified that the separated liquor could be economically treated by dewatering in a centrifuge to produce a slurry of 50% solids content. This slurry was then mixed with an equal weight of sugar, and the batch concentrated by evaporation to produce a relatively dense paste. Such a paste is usable for various purposes, including confections, where the fat content is not objectionable or may be desirable.

EXAMPLE 3

The material used in this instance was the moist paste or mash produced as described in Example 1 and corresponding to Product A of FIG. 1. Three hundred and seventy-five (375) pounds of this moist paste was added to 200 pounds of corn syrup at 80 Brix, in an evaporating kettle. This batch was heated to boiling point, after which 100 pounds of invert syrup at 70 Brix was added, followed by 100 pounds of granulated sugar (sucrose). With continual agitation this batch was gradually evaporated to a concentration of 81 Brix. When cooled this product was a paste corresponding to Product D of FIG. 1. A portion of this paste was passed while hot through a mill of the Granite type, having four rolls, with successive rolls rotating at twice the speed of the preceding roll. The resulting product was a fine butter-like paste.

The paste described above in this Example 3 had a body or a viscosity due not only to sugar concentration, but also because of the absorptive character of the finely divided coconut particles. Thus in such a product the impregnated coconut particles have a thickening effect upon the paste, and this thickening effect is still effective during the elevated backing temperatures. The fat content of the product is held in situ by the absorptive properties of the modified coconut particles. When such pastes are used in the baking industry, they may be employed without dilution but generally they are diluted by mixing with additional sugar syrup, or sugar syrup containing materials. In connection with the manufacture of cookies, such diluted paste can be deposited in masses or layers of the desired dimensions, either on top of an unbaked cooky form, as a layer or filler between two or more forms, or as a filler enveloped in dough. Upon baking the paste remains substantially intact, and at the elevated temperatures it does not run as a fluid, and it does not permeate the adjacent baked dough. Also such a filler does not stick to the pan during baking, although it be in direct pan contact. The same applies to incorporating such paste materials in cake doughs and batters, and in bread or rolls where a sweet filling is desired.

The final baked products obtained by the use of such pastes, in concentrated or diluted form, have excellent eating properties. The mild coconut flavor of the incorporated coconut particles is not dominant, and thus other flavors contained in the material are not masked.

EXAMPLE 4

The procedure was the same as in Example 1 to the point of forming a moist press cake of tenderized coconut from the step 13 of FIG. 1. Before disintegration, this press cake was mixed with an equal quantity of fresh water, and then subjected to a second stage of filter pressing. The resulting press cake was then subjected to disintegration as described in Example 1 to produce a smooth, moist paste. Washing before disintegration served to remove some of the salt and residual coconut flavors. Two hundred pounds of this moist paste was mixed with sugar syrup and sugar in the same manner and proportions as described in Example 3. In addition there was added to the batch 200 pounds of depitted single strength peach puree. This batch was then placed in an evaporator of the vacuum kettle type, provided with agitation, and concentrated by evaporation to 60 Brix, with a vacuum corresponding to 28 inches mercury column being applied. This batch was then further concentrated to 80 Brix by use of planetary evaporating equipment of the type disclosed in copending application Ser. No. 288,009.

The paste produced according to the above Example 4 had a mild peach color together with a good peach flavor. Most of the fine coconut pieces could not be individually seen in the material, but those that were discernible because of their size had absorbed the color, flavor and other distinguishing characteristics of the puree.

EXAMPLE 5

The starting material was 400 pounds of the moist material produced as described in Example 1 but before disintegrating in step 14. This mash was held for a period of 24 hours at 90°F. while exposed to atmosphere having a humidity of about 80%. During this time the mass was stirred several times. It was observed that some fermentation or enzymatic activity was taking place, and at the end of the 24 hour period the material had developed a distinct cheese-like odor. Also the mass had developed a soft cheese-like consistency, and it was observed that the particles of coconut were more tender than the particles of the starting coconut material. To this material there was added 100 pounds of cottage cheese curd of the type known as pot cheese. This had a solids content of about 30% and about 65% of the solids was protein. The cheese and moist coconut material were supplied to a hammer mill whereby the materials were effectively mixed and dispersed, with the pieces of coconut being reduced to the desired size. A syrup was formulated as follows:

| | |
|---|---|
| Corn syrup at 80 Brix | 200 lbs. |
| Sorbitol | 100 lbs. |
| Hydrolyzed cereal solids (10 D.E.) known by the trade name of Morex | 100 lbs. |

The batch of partially fermented moist coconut cheese paste was added to the above syrup, and the batch heated and agitated to make it homogeneous. It was then concentrated by evaporation by use of the planetary type of evaporating equipment referred to in Example 4. The evaporating cycle was started with the temperature of the batch at about 160°F. and was terminated at about 160°F. and at 80 Brix. At this point the batch had a slightly yellowish color which was apparently due to the heat treatment. The final product after cooling had a mild cottage cheese-like aroma, and a smooth cheese-like consistency. The product had a protein value equal to or greater than the original coconut meat used for processing, although something of the order of 30 to 50% of the original protein of the coconut had been removed in the acid treatment. In other words, removed natural protein had been replaced by the added cheese protein.

Some of the final product produced in accordance with this Example 5 was subjected to milling, making use of milling equipment of the roll type. This served to produce a butter-smooth end product comparable to so-called almond paste.

It was confirmed that one or more flavoring ingredients could be added to the cheese-like product produced in this Example 5. For example, just before milling as described above, a small amount of oil of almond was added. This served to produce a product having the physical character, mouth feel and flavor of almond paste.

Although pot cheese was used in the foregoing example, it was confirmed that other types of cheeses could be employed, including cheddar cheese.

The fermentation step described in this Example 5 appeared to materially enhance the properties of the final product, particularly in that it developed a moderate fermented flavor without development of objectionable off-flavor or aroma. At the end of the fermentation step it was noted that the material had been converted to a plastic mass of smooth texture such as is normally associated with cheese, which was attributed to some further subdivision taking place during fermentation without freeing fat.

It was found that the coconut material after fermentation could be blended with other foods, such as chocolate and tomato pate.

The presence of added protein appeared to enhance the properties of the final product, particularly with respect to promoting a good mouth feel and general palatability comparable to such products as cheese and almond paste.

EXAMPLE 6

The procedure was generally as in Example 5, but instead of introducing pot cheese into the batch, another dispersible form of protein was substituted. Particularly a form of dry powdered soluble casein was used. The final product obtained in this manner had less of the cheese flavor of the product produced in Example 5, but other characteristics were comparable.

EXAMPLE 7

One hundred pounds of liquid condensed nonfat milk (40% solids) was blended with 200 pounds of corn syrup in a scraper agitated steam kettle. Evaporation was continued for a sufficient period to concentrate the batch to 95 Brix, which served to caramelize the milk constituents and to convert the mass into a caramel-like brownish color. Heating at this point was discontinued and sufficient cold water added to reduce the concentration of the batch to 80 Brix. Heat was then again supplied at 400 pounds of the moist tenderized coconut paste as produced in Example 1 was added while the batch was being subjected to continuous agitation. After about 10 minutes 100 pounds of invert syrup was added, and after a further 10 minutes 100 pounds of sucrose was added. Evaporation was continued with agitation until the batch reached a concentration of 68 Brix. The resulting product when cool was likewise a caramel flavored base paste usable in various food products, and by virtue of the added condensed milk it possessed a substantial protein content.

A portion of the product produced in the foregoing Example 7 was further concentrated to about 82 Brix by making use of the planetary type evaporating equipment referred to in Example 4. When cooled to ambient room temperatures the batch was a relatively firm confection-like product suitable for shipment in packages. It was usable in this form, or after dilution as described, as by mixing with sugar syrup.

It was found that when this example was carried out (i.e., the evaporating cycle) in such a manner as to produce a concentration of about 90 Brix, the product upon cooling could be subdivided to form a free flow and ostensibly dry divided material.

EXAMPLE 8

The procedure was generally the same as in Example 3. However, instead of utilizing a syrup formulated as described in Example 3, the syrup was modified by incorporating melted chocolate together with coconut fat. More specifically, 50 pounds of melted chocolate was homogeneously mixed with 50 pounds of coconut fat derived from centrifuging liquor removed from the separating step 11 of FIG. 1. This fat fraction also contained some of the other ingredients derived from the coconut meat, including some dissolved and undissolved solids. The fat was then homogeneously incorporated with the coconut mash and the sugar syrup (at 50 Brix), and the batch evaporated to about 80 Brix. The resulting product was a concentrated base paste which was chocolate flavored and colored and suitable for use in various food products in the same manner as the sugar based paste described in Example 3. The fat content appeared to be intimately incorporated with the coconut solids, presumably by absorption. It was noted that there was little tendency for free fat to separate from the product during subsequent processing, such as with depository rolls.

With reference to the above Example 8, it should be understood that due to the action of the acid solution at an elevated temperature, the major portion (e.g., 80%) of the fat that it liberated from the coconut comes off in step 11. This is likewise true of the protein, sugar and other solubles that are liberated. If some fat is to be removed, it is deemed more expedient to remove it by centrifuging the liquor from step 11. If step 11, is omitted, then all of the liberated fat and other solids come off in the liquor from step 13.

it was also verified that both steps 11 and 13 could be omitted, with the result that all solids of the batch (e.g., fat, protein, etc.) were present in the final products.

EXAMPLE 9

The source material in this instance was commercial sun or kiln dried clean copra meal containing skins as well as coconut meat. One hundred (100) pounds of expeller meal resulting from the grinding of copra, followed by pressing for removal of a substantial part of the oil content, was treated in the manner described in U.S. Pat. No. 2,422,983 to effect separation of skins from the meat. The coconut meat was then introduced into 600 pounds of boiling water to effect hydration as in Example 4. This material was dewatered in a basket type centrifuging and the resulting moist presscake introduced into 600 pounds of water containing 1% hydrochloric acid. The batch was then boiled at atmospheric pressure for 7 minutes. This served to tenderize the coconut meat and to weaken the bond between the meat and residual skin material without altering the physical identity of the particles. The batch mass of material was then treated to hydraulic separation carried out in the manner described in U.S. Pat. No. 2,422,893, to remove remaining skin material. The remaining batch was centrifuged in a basket type centrifuge apparatus to dewater the same, and the acid of the remaining moist presscake was neutralized by soaking it in a solution of sodium bicarbonate prepared as in Example 1. Further centrifuging served to remove the free liquor together with most of the by-product sodium chloride. The resulting presscake was in the form of a moist granular material with the individual particles tenderized uniformly throughout. It was readily reduced to a smooth paste by disintegration in the manner described in Example 1.

The foregoing Example 9 makes use of mechanical separation of skins from coconut meat but in a manner which gives results superior to the results obtained with the method of U.S. Pat. No. 2,422,893. In addition, the separation of skins is carried out in connection with a tenderizing operation which produces a different final product.

While the foregoing Example 9 demonstrates that copra meal can be used in conjunction with separation of skins, the final products obtained are not deemed to be of the same quality as those produced by the use of fresh coconut or the desiccated forms of coconut, having reference particularly to such quality factors as color and flavor.

EXAMPLE 10

A chicken was boiled in 3 lbs. of water for 30 minutes and the meat separated from the bones. The bones were crushed and marrow removed. The removed meat and marrow together with skin, heart and liver were ground together in a meat grinder and again boiled to a concentration of 30% solids where it began to thicken due in large part to its gelatin content. This stock was mixed with one-half its weight of tenderized coconut paste as described in Example 1. With brisk agitation the stock was then cooked down to 50% solids, at which point it was a thick paste. The addition of the coconut broke up the gel and converted the stock to a material similar in many respects to nut paste. The final product was usable as a filler in various food products, particularly refrigerated distributed dough products. In baking such dough products, the filler did not liquify or run. Also in storage, moisture did not migrate from the filler to the dough in such fashion as to deteriorate the dough. Such a bakery product could be merchandised in the form of a refrigerated tart with the filler comprising one-third of its weight.

The final filler type product of this Example 10 had the characteristics expected of a good sauage filling, in that it did not form a jell, was not pasty, and in baking it did not form a crumb. When used as a filling in dough, after baking it retained its moisture after refrigerated storage for several weeks, without migrating into the baked dough.

EXAMPLE 11

The source material was the same as in Example 1, namely 100 lbs. of desiccated shredded coconut. The coconut was immersed in 300 lbs. of water at 212°F. Sufficient heat was applied to bring the temperature back to 212°F. after addition of the coconut, and then the batch was held at this temperature for about 15 minutes. The batch was then centrifuged in a centrifuge of the basket type, whereby 136 lbs. of moist hydrated coconut was obtained. The liquid removed was also centrifuged to produce fat and water fractions, the fat weighing 21 lbs. The moist coconut, which had a moisture content of about 40%, was then added to a boiling acid solution prepared by introducing 3.5 lbs. of a 37% solution of hydrochloric acid into 250 lbs. of water. After boiling for 15 minutes, the acid was neutralized as in Example 1 by addition of cold sodium bicarbonate solution. The treated moist coconut particles when removed from the liquid after this treatment had substantially the same properties as described in Example 1. They had a slightly salty taste due to the residual salt content. This could be largely removed by simple washing. This product had good extrudability when tested in the manner previously described. The material had substantially the same extrudability as in Example 1. The fat and protein contents of the tenderized pieces were somewhat lower than the pieces produced by Example 1 which was attributed to the removal of a substantial amount of fat and protein before and immediately after the acid treatment. Due to the reduced fat content, the pieces were somewhat more absorptive than the pieces of Example 1.

Disintegration of the tenderized moist coconut produced in this Example 11 produced a paste or mash corresponding to Product A of FIG. 1.

EXAMPLE 12

The source material was 100 pounds of commercial desiccated coconut like that used in Example 1. 300 pounds of water was acidified by addition of 3½ pounds of hydrochloric acid solution to provide a treatment solution of pH 1.2. The solution was heated for about 13 minutes to boiling point, in a steam jacketed kettle, with steam being supplied at 40 p.s.i. 100 pounds of the desiccated coconut was then added with continued agitation. With continued heating the temperature of the batch was brought back to boiling point in about 5 minutes. Treatment at boiling point was continued for 18 minutes. The supply of steam was then shut off and a neutralizing solution added to the batch consisting of 2¾ pounds of sodium bicarbonate dissolved in 25 pounds water. After addition of the neutralizing solution, which reduced the temperature to about 180°F., the batch was held for a period of 10 minutes. At the end of that time the liquid was at pH 5.7 and the batch was at a temperature of about 160°F. The batch was removed from the kettle and introduced into a basket type centrifuge for dewatering. The moist modified coconut removed from the centrifuge after dewatering amounted to 170 pounds. The resulting presscake had a moisture content of 67% and the presscake liquor was at about pH 6.0. It was determined that the liquor removed in the centrifuging operation represented removal of 23 pounds of fat from the original 100 pounds of desiccated coconut.

The moist presscake produced as described above was passed through a Fitzpatrick comminuting mill to form a moist paste or mash.

A batch was prepared consisting of 56 pounds of the moist paste or mash produced as described above, together with 20 pounds corn syrup, 15 pounds Nulomoline (invert sugar syrup), 21 pounds granulated sugar and 1 pound salt. This batch at 50 Brix was introduced into the steam jacketed container of a Hobart planetary type mixer. The container of the mixer was about 18 inches inside diameter. It was provided with a mixing device rotating on a vertical axe spaced 3 inches off center and also rotating about the central vertical axes of the container. The mixer was operated at slow speed for a period of 5 minutes to homogeneously intermix the ingredients. Heat was then applied to carry out an evaporating cycle in the manner described in copending application Ser. No. 288,009 filed Sept. 11, 1972. More specifically, steam was applied to the jacket of the planetary container at a pressure of 40 p.s.i. Heating was continued with operation of the mixer over an evaporating period of 40 minutes, using a driving speed which rotated the mixing device at a speed of 206 rpm about its individual axis and about 69 rpm about the central vertical axis of the container. This evaporating cycle concentrated the syrup to 80 Brix. The supply of steam was then discontinued and the steam jacket of the container drained. Driving of the agitated device was continued at low speed with the contents at a temperature of about 160°. Flavoring ingredients were then added, namely 16 cc. of almond oil and 40 cc. vanilla extract. After effective mixing of the flavoring, the batch was cooled by circulating cooling water through the jacket of the container and was then discharged at about 130°F. into polyethylene lined fiber boxes. Upon cooling the batch was a relatively viscous paste having a light brown color and suitable for use as almond paste in the baking industry.

EXAMPLE 13

The procedure of Example 12 was repeated but with the batch as introduced into the container of the Hobart planetary mixer comprising 56 pounds of the moist mash, 15 pounds of corn syrup, 15 pounds of Nulomoline and 15 pounds of granulated sugar. This batch at 55 Brix was then intermixed in the container of the Hobart mixer by driving the agitating device at low speed for a period of 5 minutes without supplying steam to the jacket of the container. Heat was then supplied by introducing steam at 40 p.s.i. and the agitating devices driven at the higher speed specified in Example 12, for a period of 10 minutes. This served to concentrate the mass by evaporation to about 60 Brix. At that time the driving speed of the agitating device was increased to about 360 rpm about the individual axis of the mixing device and 120 rpm about the central axis, and evaporation continued for a further period of 20 minutes to produce a concentration of 82 Brix. The supply of heat was then discontinued and the batch removed from the container. This product was light tan in color and relatively stiff in consistency. It was noted that there was less caramelization than with the batch of Example 12, which was attributed to the lower temperatures and shorter time of the evaporating cycle.

I claim:

1. In a process for the treatment of particulate coconut meat characterized by aligned rod-like cells arranged in cell bundles, immersing the coconut meat in a water solution of a physiologically acceptable acid at an elevated temperature and at a pH and for a period of time sufficient to effect disruption of the cells and loosening of the cells with respect to each other thereby tenderizing and promoting absorptivity of the meat, causing residual acid of the meat to be neutralized and free liquor to be removed to provide moist tenderized coconut meat, and subjecting the moist tenderized meat to disintegration to form a paste or mash, and incorporating the mash with another edible sugar containing material.

2. A process as in claim 1 in which the moist paste or mash after being incorporated with an sugar containing edible material is in the form of a fluid and in which the fluid is then subjected to evaporation to concentrate the same.

3. A process as in claim 1 in which the edible material includes dispersed protein.

4. A process as in claim 1 in which the edible material includes fat.

5. A process for the treatment of desiccated coconut meat, the steps of introducing the coconut meat into an acid solution at a temperature of the order of 180° to 250°F. and at a pH of from 2 to 0.57, holding the coconut in the acid solution for a period of at least 1 minute whereby the coconut meat is tenderized, neutralizing the acid of the batch by addition of a neutralizing agent, removing free liquor from the moist tenderized coconut meat after neutralizing, and subjecting the removed liquor to concentration by dewatering and evaporation, thereby forming a paste-like product containing coconut fat, protein and finely divided fiber derived from the coconut meat.

6. In a process for the treatment of desiccated coconut meat, the steps of introducing the coconut meat into an acid-water solution at a temperature of the order of 180° to 250°F. and at a pH of from 2 to 0.57, holding the coconut in the acid solution for a period of time of at least 1 minute to cause the coconut meat to be tenderized, causing acid of the meat to be neutralized and separating the moist tenderized coconut meat from free liquor, subjecting the moist tenderized meat to disintegration to form a moist paste or mash, combining the mash with a sugar containing material, subjecting the resulting batch to evaporation to concentrate the same, and then cooling the batch to form a coconut paste.

7. A process as in claim 6 in which an edible material is separated from the separated free liquor and is introduced into said resulting batch.

8. A process as in claim 1 in which the mash is subjected to fermentation.

9. An edible coconut paste or mash made by the process of claim 1.

10. An edible coconut paste or mash made by the process of claim 3.

11. An edible coconut paste or mash made by the process of claim 4.

12. An edible base paste made by the process of claim 6.

* * * * *